United States Patent
Catrein et al.

(10) Patent No.: US 9,172,657 B2
(45) Date of Patent: Oct. 27, 2015

(54) TECHNIQUE FOR RESOURCE CREATION IN A CLOUD COMPUTING SYSTEM

(75) Inventors: Daniel Catrein, Wurselen (DE); Rene Rembarz, Aachen (DE); Johannes Willig, Bornheim (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 226 days.

(21) Appl. No.: 13/988,612

(22) PCT Filed: Nov. 22, 2010

(86) PCT No.: PCT/EP2010/007065
§ 371 (c)(1),
(2), (4) Date: May 21, 2013

(87) PCT Pub. No.: WO2012/069064
PCT Pub. Date: May 31, 2012

(65) Prior Publication Data
US 2013/0238805 A1  Sep. 12, 2013

(51) Int. Cl.
*G06F 15/173* (2006.01)
*H04L 12/911* (2013.01)
*G06F 9/50* (2006.01)

(52) U.S. Cl.
CPC ............. *H04L 47/70* (2013.01); *G06F 9/5072* (2013.01)

(58) Field of Classification Search
CPC .............................. H04L 47/70; G06F 9/5072
See application file for complete search history.

(56) References Cited

U.S. PATENT DOCUMENTS

| | | | |
|---|---|---|---|
| 2009/0300607 A1* | 12/2009 | Ferris et al. | 718/1 |
| 2011/0231525 A1* | 9/2011 | Balani et al. | 709/220 |
| 2011/0295999 A1* | 12/2011 | Ferris et al. | 709/224 |
| 2011/0307523 A1* | 12/2011 | Balani et al. | 707/802 |

(Continued)

OTHER PUBLICATIONS

Chan, et al., "Modeling and Testing of Cloud Applications", IEEE Asia-Pacific Services Computing Conference 2009 (APSCC), IEEE, Dec. 7, 2009, pp. 111-118, XP031615909.

(Continued)

*Primary Examiner* — Krisna Lim
(74) *Attorney, Agent, or Firm* — Rothwell, Figg, Ernst & Manbeck, P.C.

(57) ABSTRACT

A technique for creating a resource in a cloud computing system is described. A method implementation of this technique comprises providing a plurality of predefined base resource descriptions, each base resource description defining a base resource in the cloud computing system and specifying one or more properties of the base resource, providing a plurality of predefined modifiers, each modifier being applicable to a resource in the cloud computing system to add, remove or change a property of the resource, wherein each modifier is associated with metrics information, and receiving a resource request indicating one or more desired properties for a target resource in the cloud computing system. In response to receipt of the resource request, a selection operation is performed to select a base resource description and one or more modifiers that are to be applied to the base resource corresponding to the selected base resource description to create the target resource in the cloud computing system, wherein the selection operation is based on the metrics information. In a next step, the selected base resource description is deployed to create the corresponding base resource in the cloud computing system, and application of the selected modifiers to the base resource in the cloud computing system is triggered to create the target resource.

25 Claims, 3 Drawing Sheets

(56) References Cited

U.S. PATENT DOCUMENTS

2012/0054280 A1* 3/2012 Shah ............................. 709/205
2012/0072465 A1* 3/2012 McGowan et al. ........... 707/803

OTHER PUBLICATIONS

Ding, et al., Taming Software Adaptability with Architechture-Centric Framework:, IEEE International Conference on Pervasive Computing and Communications 2010 (PERCOM), IEEE, Mar. 29, 2010, pp. 145-151, XP031677614.

Machida, et al., "Just-in-Time Server Provisioning using Virtual Machine Standby and Request Prediction". International Conference on Autonomic Computing 2008 (ICAC), Jun. 2, 2008, pp. 163-171 XP091276805.

Namman, et al., "Composition Planning for Networked Appliances", International Conference on Dependable, Autonomic and Secure Computing 2009 (DASC), Dec. 12, 2009, pp. 90-94, XP031609898.

Niemoller, et al., "Ericsson Composition Engine-Next generation IN", Ericsson Review, Mar. 1, 2009, pp. 22-27, XP7917560.

Sun, et al., "Simplifying Service Deployment with Virtual Appliances", International Conference on Services Computing 2008 (SCC), Jul. 7, 2008, pp. 265-272, XP031291269.

* cited by examiner

TECHNIQUE FOR RESOURCE CREATION IN A CLOUD COMPUTING SYSTEM

CROSS-REFERENCE TO RELATED APPLICATION

This application is a 35 U.S.C. §371 National Phase Entry Application from PCT/EP2010/007065, filed Nov. 22, 2010, and designating the United States, the disclosure of which is incorporated by reference herein.

TECHNICAL FIELD

The present disclosure generally relates to the field of cloud computing. In particular, a technique for creating a virtual machine or any other resource in a cloud computing system is described.

BACKGROUND

Cloud computing and virtualization are current trends in the field of information technology that are also gaining momentum in neighboring fields such as telecommunication. A primary advantage of cloud computing is the fact that it can almost instantly provide unlimited computing, storage, or networking resources.

Large public cloud providers, such as Amazon, can provide hundreds or thousands of computers in a matter of minutes to any user in need of cloud computing resources. Computing clouds may also be private, for example, to a company. In a private cloud scenario, the cloud is operated and used by the same company, and virtual resources are only made available inside the company. By their nature, private clouds have a limited capacity and are therefore often combined with public clouds to create so-called hybrid clouds so as to jointly utilize public and private cloud resources.

Today, different computing clouds typically rely on different technologies. That is, there are little standardization efforts regarding, for example, Application Programming Interfaces (APIs), virtualization platforms (so-called hypervisors) or resource description formats (e.g., for Virtual Machines, VMs). Also, the environments offered by the clouds (e.g., with respect to networking) may differ from cloud provider to cloud provider. Major providers that offer public or private clouds are VMware with their own hypervisor, the vCloud and vSphere APIs and a proprietary format for virtual machines, Amazon with Xen as hypervisor, the EC2 and S3 APIs and their own proprietary AMI format for virtual machines, or Eucalyptus with KVM or Xen as hypervisor, the EC2 and S3 API and the proprietary EMI virtual machine format, to name only three providers.

To create cloud computing resources for a specific service, conventionally a customized virtual machine image is first defined locally for the service. This image is then uploaded ("deployed") via the API to the computing cloud. As a next step, a new virtual machine is started (sometimes also referred to as "deployed") in the cloud, again via the API, from that image. Afterwards, some cloud technologies, e.g., VMware, allow for a certain customization of the deployed virtual machine by executing a customization script. Similar deployment approaches are utilized for other virtual resources (e.g., for cloud storage or networking resources).

Some of the major challenges for cloud management solutions are the efficient management of the various configurations of resources that need to be maintained across different clouds and the complexity arising from hybrid clouds (e.g., in the case of different hypervisors and different hypervisor-specific managers). It is becoming increasingly apparent that the management of cloud resources and their configuration is a demanding task as, in any realistic deployment, a very broad range of resources are requested by the cloud users, and these are typically not generic "base resources" such as an "empty" operating system or an "empty" application server. Rather, in many cases various items of software still need to be deployed, and customizations have still to be made.

A typical base resource can be a virtual machine with an installed operating system. To turn it into a target resource with desired resource properties, application software needs to be installed and configured (i.e., customized). Furthermore, additional cloud resources such as networking or attached storage resources may need to be set up. As an example, the Ericsson Composition Engine (ECE) as described in J. Niemöller et al., "Ericsson Composition Engine—Next-generation IN", Ericsson Review, 2/2009, pages 22 to 27 may need to be installed on an application server in a cloud computing system to turn the application server into the desired target resource. After the basic ECE software is installed, different so-called skeletons need to be deployed to instruct the ECE how to react to incoming signals. Also for the skeletons, many further customizations can exist, for example to adapt the ECE to the needs and environments of different customers.

The ECE example illustrates the huge amount of possible configurations of a cloud resource that need to be managed in an efficient manner to arrive at a desired target resource in the cloud computing system. Existing solutions typically address this challenge by creating a so-called resource template for each possible resource configuration (e.g., for each possible virtual machine image). Although there are first attempts to make configurations more dynamic (e.g., post-deployment scripts in VMware vCenter), these attempts still rely on many static base resources.

The amount of pre-configured resource templates that define a set of base resources can thus become enormous. Moreover, the manual management effort required to, for example, post-configure a deployed base resource to turn it into the desired target resource necessitates, for example, that all deployed images need to be updated one by one. In hybrid cloud scenarios, this effort most often has to be multiplied by the number of hypervisor types used, because the virtual machine formats and template generation mechanisms are often not compatible with each other.

SUMMARY

There is a need for a technique that allows for a more efficient creation of resources in a cloud computing system.

According to a first aspect, a method of creating a resource in a cloud computing system is provided. The method comprises the steps of providing a plurality of predefined base resource descriptions, each base resource description defining a base resource in the cloud computing system and specifying one or more properties of the base resource, providing a plurality of predefined modifiers, each modifier being applicable to a resource in the cloud computing system to add, remove or change a property of the resource, wherein each modifier is associated with metrics information, receiving a resource request indicating one or more desired properties of a target resource in the cloud computing system, performing a selection operation to select a base resource description and one or more modifiers that are to be applied to the base resource corresponding to the selected base resource description to create the target resource in the cloud computing system, wherein the selection operation is based on the metrics information, deploying the selected base resource description to create the corresponding base resource in the cloud computing system, and triggering application of the selected modifiers to the base resource in the cloud computing system to create the target resource.

During the selection operation, more than one modifier may be selected. In case of a selection of multiple modifiers, the selection result may be indicative of a particular (e.g., an optimized) modification sequence. The modification sequence may define the order in which the selected modifiers have to be applied to the base resource that corresponds to the selected base resource description to turn it into the target resource.

The target resource may be comprised of multiple target resource instances in the cloud computing system. A required number of target resource instances in the cloud computing system (as, e.g., indicated in or derived from the resource request) may be created in a two step approach. In a first step, the required number of base resource instances is created in the cloud computing system based on the selected base resource description. Then, in a second step, each base resource instance is modified based on the selected modifiers to turn into an instance of the target resource. The second step may centrally be triggered for several base resource instances at a time in case more than one target resource instance is to be deployed.

The cloud computing system may comprise one or more individual computing clouds, and each individual computing cloud may either be a private or a public cloud. In multi-cloud scenarios, the method may further comprise selecting one or more of the computing clouds and deploying the base resource description to the selected one or more computing clouds. The computing cloud selection may be based on one or more parameters, including at least one of the metrics information, proximity to a resource requestor (e.g., in terms of network hops or gateways, communication speed, and so on), latency with respect to the deployed target resource, reliability with respect to the deployed target resource and load considerations (e.g., for load balancing purposes). As an example, in telecommunication networks certain requirements (e.g., regarding latency and reliability) with respect to a network node deployed in the cloud computing system need to be met. Therefore, in case the target resource corresponds to such a network node, the cloud which will best fulfil the applicable requirements will be selected for deploying the corresponding base resource description.

In one implementation, resource utilization information is received from the cloud computing system (e.g., in response to deployment of the selected base resource description and/or the application of the selected modifiers). The resource utilization information may in a subsequent step be forwarded to a resource requestor. The resource requestor may be the entity from which the resource request has been received. The resource utilization information may relate to various items of information. In one example, the resource utilization information comprises at least one of a network address of the target resource in the cloud computing system, login credentials for the target resource, and service configuration information pertaining to the target resource.

The selection operation regarding the base resource description and the one or more modifiers that are to be applied can be performed in various ways. In an exemplary implementation, the selection operation comprises performing an optimization procedure based on the metrics information associated with each modifier (and, optionally, with each base resource description). The optimization procedure may be based on any optimization algorithm, including Dijkstra's algorithm, the Bellman-Ford algorithm, and branch-and-bound or branch-and-cut type algorithms. Moreover, the optimization procedure may be based on linear or non-linear optimization.

The resource creation technique presented herein may be graph-based. Specifically, the selection operation may be based on a graph. In this context, a graph having nodes may be defined, wherein the nodes comprise one or more resource nodes representative of the base resource descriptions (or the corresponding base resources) and one or more modifier nodes representative of the modifiers (or of resources to which the modifiers have been applied). The metrics information may be associated as weight with each modifier node. Moreover, in cases in which the base resource descriptions are also associated with metrics information, the corresponding metrics information may be associated as weight with each resource node.

In a graph-based scenario, the selection operation may comprise performing a path optimization procedure in the at least one graph based on the metrics information. The path optimization procedure may be based on any path-finding algorithm (e.g., on a shortest path algorithm).

In one example, the at least one graph is a directed graph in which each resource node defines a terminal node (e.g., a root or leaf node) and each modifier node defines a child node of at least one terminal node (which will then be a root node) or of at least one other child node (which is not a root node). In such a scenario, the at least one graph may comprise different types of terminal nodes. For example, the graph may comprise a single first terminal node located at a first end of the graph and representative of the target resource and one or more second terminal nodes located at a second end of the graph opposite to the first end and representative of all base resources to which modifiers can be applied to create the target resource. The graph may further comprise one or more inner nodes corresponding to all modifiers that, when applied singly or in combination to any base resource, result in the target resource.

In the above scenario, the selection operation may comprise determining the shortest path between the first terminal node and any of the second terminal nodes (e.g., taking into account the metrics information). It should be noted that the graph may be traversed from the first terminal node to the at least one second terminal node or in the opposite direction.

The graph may be defined (e.g., created) in response to receipt of the resource request or in response to any other triggering event. In this context, suitable base resource description information as well as suitable modifier information (together with associated metrics information) for defining the graph may be selected dependent on the desired properties of the target resource.

As has already been explained above, in addition to each modifier, each base resource description may also be associated with metrics information. Accordingly, the selection operation to select a base resource description and one or more modifiers to be applied thereto may additionally be based on the metrics information associated with the base resource descriptions.

The metrics information may generally relate to one parameter or to a parameter set comprising two or more parameters. Exemplary parameters that may define the metrics information may comprise at least one of a time parameter, a bandwidth parameter (e.g., specifying certain bandwidth requirements), a processing power parameter (e.g., specifying certain processing power requirements), a storage parameter (e.g., specifying certain storage requirements) and a cost parameter (in a financial or non-financial sense).

The base resource descriptions may dynamically be maintained. As an example, a new base resource description may be created based on a frequently requested target resource having particular resource properties. In this way, the number of subsequent modifications to arrive at the frequently requested target resource having the particular resource properties may be reduced. Additionally, one or more deletion criteria for deleting base resource descriptions may be defined, and a base resource description may be deleted in accordance with the one or more deletion criteria. An exemplary deletion criterion may specify a minimum number of requests or selection operations with respect to a specific base resource description within a predefined period of time.

In one variant, one or more idle resources already deployed earlier in the cloud computing system are exploited for creating the target resource. According to this variant, the step of deploying a base resource description in response to receipt of the resource request may in certain cases be omitted. The statements made above and hereinafter (e.g., with respect to the application of one or more modifiers) regarding the base resource descriptions and the base resources created therefrom in response to receipt of the resource request can likewise be applied to idle resources.

Specifically, it may be determined based on the metrics information that an idle resource in the cloud computing system is more suitable as a base resource for creating the target resource than any base resource created from a base resource description which still has to be deployed. For this purpose, metrics or related information may also be associated with one or more idle resources already deployed in the cloud computing system. In a next step, the modifiers (if any) required to create the target resource from the idle resource are selected (e.g., based on the metrics information associated with the modifiers and, optionally, the one or more idle resources). In a further step, the application of the selected modifiers to the idle resource in the cloud computing system is triggered to create the target resource from the idle resource.

The idle resources may be created according to various creation strategies. In one implementation, one or more base resource descriptions are pre-emptively deployed to create one or more idle resources in the cloud computing system. As understood herein, the term "base resource" is used both for an idle resource (which generally has been deployed prior to receipt of the resource request on the basis of a base resource description or on any other basis) as well as to "conventional" base resources (which are created after receipt of the resource request based on a base resource request).

The base resources may comprise a large variety of resources, including at least one of one or more virtual machines, one or more virtual network elements (e.g., virtual routers), one or more virtual core nodes of a telecommunication system and one or more virtual data storages. The base resource description of a virtual machine may define, or take the form of, a virtual machine image or a template thereof.

In general, the base resource descriptions may be configured as at least one of resource templates and parameter sets. A resource template typically refers to a virtual resource, and the template can be seen as a blueprint for creating a new instance of the resource (e.g., a virtual machine). A base resource description may also be configured as a set of parameters or a reference thereto. As an example, such a parameterized configuration of the base resource description may be used for defining storage space in the cloud computing system (i.e., a virtual storage) to be allocated to, for or as a target resource, for defining virtual networking to be set up on a (e.g., telecommunication) link or for defining a configuration or provisioning of an existing virtual machine.

The resource properties may relate to different properties (e.g., configurations) of a resource in the cloud computing system. For example, the resource properties may relate to at least one of absence or installation of a particular operating system on a particular network server, absence or installation of a particular application software on a particular network server, and configuration of a particular application software installed on a particular network server. In a similar manner, the modifiers may be adapted to configure the properties of a resource in the cloud computing system based on various types of operations, including one or more of execution of a script, installation of a software package, a Hypertext Transfer Protocol (HTTP)-based operation, and a file operation. In general, triggering application of a modifier to a resource in the cloud computing system may be performed centrally in a command-based manner.

The technique presented herein may be realized in the form of software, in the form of hardware or using a combined software/hardware approach. As regards a software aspect, a computer program product comprising program code portions for performing the steps presented herein when the computer program product is executed on a computing device is provided. The computer program product may be stored on a computer-readable recording medium such as a memory chip, a CD-ROM, a hard disk, and so on. Moreover, the computer program product may be provided for download via a communication network such as the Internet.

As for a hardware aspect, a device adapted to create a resource in a cloud computing system is provided. The device comprises access to a storage providing a plurality of predefined base resource descriptions, each base resource description defining a base resource in the cloud computing system and specifying one or more properties of the base resource, and to a plurality of predefined modifiers, each modifier being applicable to a resource in the cloud computing system to add, remove or change a property of the resource, wherein each modifier is associated with metrics information. The device further comprises a requestor interface adapted to receive a resource request indicating one or more desired properties of a target resource in the cloud computing system, a processor adapted to select a base resource description and one or more modifiers that are to be applied to the base resource corresponding to the selected base resource description to create the target resource in the cloud computing system, wherein the selection is based on the metrics information, and a cloud interface adapted to deploy the selected base resource description to create the corresponding base resource in the cloud computing system and to trigger application of the selected modifiers to the base resource in the cloud computing system to create the target resource.

The device may take the form of a cloud resource manager interfacing a resource requestor on one side and one or more computing clouds on an opposite side. The resource requestor may be realized as a user terminal coupled to the cloud resource manager via a network link. The cloud resource manager may be comprised of the cloud computing system.

BRIEF DESCRIPTION OF THE DRAWINGS

Further aspects and advantages of the technique presented herein will become apparent from the following description of exemplary embodiments and the drawings, wherein.

DETAILED DESCRIPTION

In the following description of exemplary embodiments, for purposes of explanation and not limitation, specific details are set forth such as exemplary selection mechanisms and optimization algorithms in order to provide a thorough understanding of the present disclosure. It will be apparent to one skilled in the art that the technique presented herein may be practised in other embodiments that depart from these specific details. For example, while the embodiments primarily relate to a graph-based selection operation it will be readily apparent that the selection operation could also be implemented in other ways that allow for an evaluation of metrics information. Moreover, while a shortest path algorithm will be discussed hereinafter as an example of an optimization algorithm, it will be understood that there exist other optimization algorithms that would likewise be suited for the selection purposes discussed herein.

Those skilled in the art will also appreciate that the services, functions and steps explained herein below may be implemented using software functioning in conjunction with a programmed microprocessor, an Application Specific Integrated Circuit (ASIC), a Digital Signal Processor (DSP) or a general purpose computer. It will further be appreciated that while the following embodiments will primarily be described in the context of methods and devices, the present disclosure may also be embodied in a computer program product as well as in a system comprising a computer processor and a memory coupled to the processor, wherein the memory is encoded with one or more programs that may perform the services, functions and steps presented herein.

Figure 1:
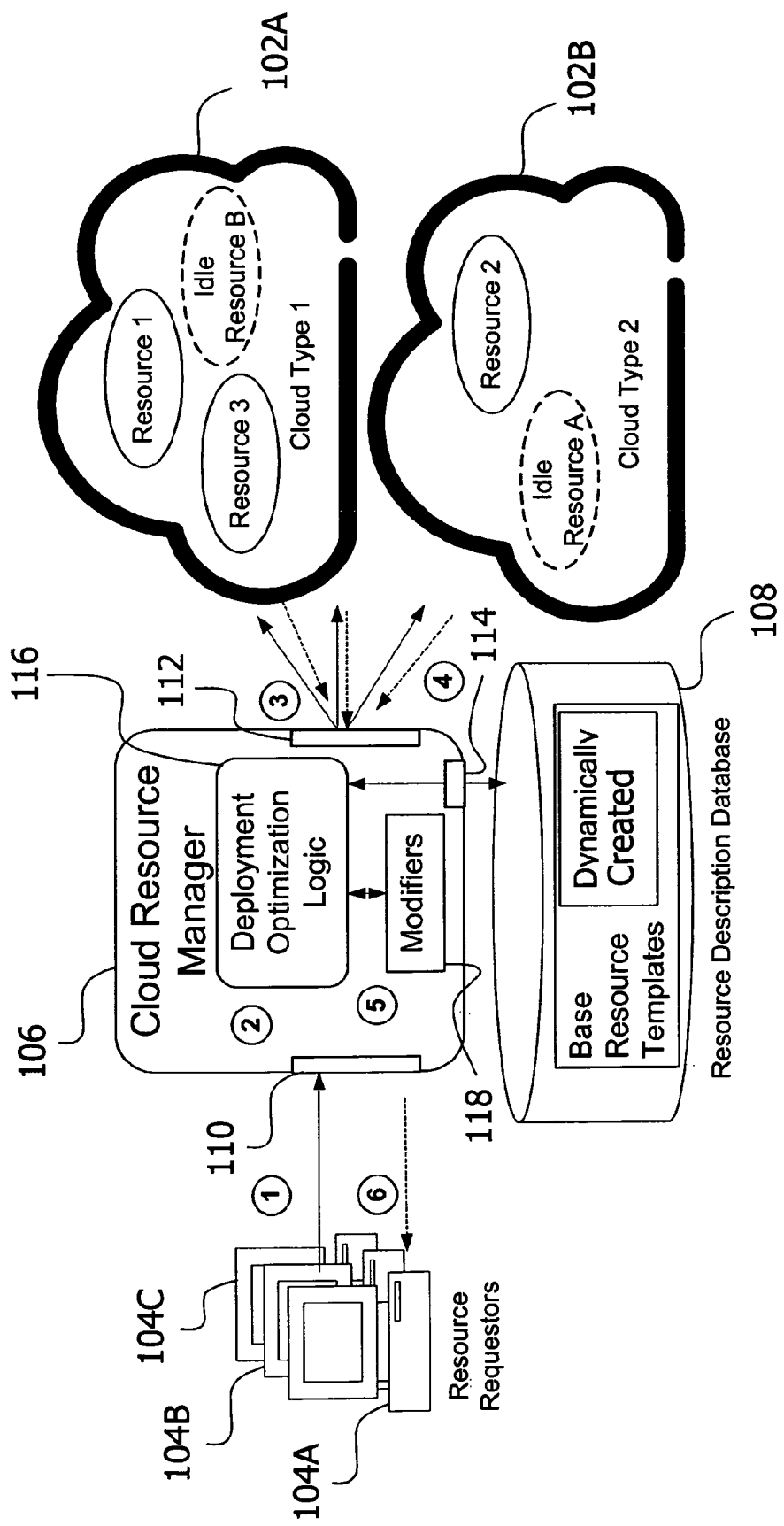
FIG. 1 exemplarily illustrates an embodiment of a cloud computing system comprising a resource requestor, a cloud resource manager and multiple computing clouds.

FIG. 1 illustrates an embodiment of a cloud computing system 100 comprising a plurality of individual computing clouds 102A, 102B, a plurality of resource requestors 104A, 104B, 104C as well as a cloud resource manager 106 located between the resource requestors 104A, 104B, 104C on one side and the computing clouds 102A, 102B on the other. The resource requestors 104A, 104B, 104C may be any entities in need of cloud computing resources. In the embodiment shown in FIG. 1, the resource requestors 104A, 104B, 104C are exemplarily illustrated as processes or programs running on computer terminals.

The computing clouds 102A, 102B may comprise public clouds, private clouds or a combination thereof and provide the same set of resources or different resources. Such resources include virtual machines, virtual network elements (including virtual switches, virtual bridges and virtual routers), virtual data storages (e.g., a Network Attached Storage, NAS) and virtual core nodes of a telecommunication network. The virtual core node refers to a virtualized node within the core network part of a telecommunication network. In such an environment, low latency and high reliability are of particular importance. Each of the computing clouds 102A, 102B may be associated with an individual set of latency and reliability parameters that may be considered by the cloud resource manager 106 when selecting a particular one of the computing clouds 102A, 102B for deployment of a particular resource (e.g., to meet the latency and reliability requirements of a particular virtual core node).

The cloud resource manager 106 may be realized in the form of a network server hosted by a provider of communication services and/or cloud computing services. The cloud resource manager 106 has access to a resource description database 108. The resource description database 108 may be co-located with the cloud resource manager 106 at a single site or may be remotely located with respect to the cloud resource manager 106 (e.g., in one or more of the computing clouds 102A, 102B).

As becomes apparent from FIG. 1, the cloud resource manager 106 comprises three interfaces 110, 112, 114. A first interface ("requestor interface") 110 is directed towards the resource requestors 104A, 104B, 104C and adapted to receive resource requests each indicating one or more desired properties of a target resource in the computing clouds 102A, 102B. The requestor interface 110 may be configured as an API.

A second interface ("cloud interface") 112 is directed towards the computing clouds 102A, 102B and is adapted to deploy base resource descriptions towards the computing clouds 102A, 102B for creating the corresponding base resources there. A deployed base resource generally has a set of properties directly inherited from its base resource description.

Additionally, the cloud interface 114 permits to trigger modifications of any resources deployed in the computing clouds 102A, 102B. It should be noted that the cloud interface 112 may implement multiple protocols and/or multiple APIs to the computing clouds 102A, 102B. Moreover, the cloud resource manager 106 may be configured to perform translation tasks between the resource requests received via the requestor interface 110 on the one hand and the respective protocols and APIs implemented via the cloud interface 112 towards each computing cloud 102A, 102B on the other.

A third interface 114 is a database interface which permits the cloud resource manager 106 to access the resource description database 108. The resource description database comprises a plurality of predefined base resource descriptions in the form of base resource templates such as virtual machine images. Each base resource template, when deployed to the computing clouds 102A, 102B, creates one or more base resource instances in the particular computing cloud 102A, 102B to which it was deployed. Moreover, each base resource template specifies one or more properties of the corresponding base resource. Such properties may generally relate to configurations of the deployed resources, the absence or installation of a particular operating system, the absence or installation of a particular application software, and so on.

Returning to FIG. 1, the cloud resource manager 106 further comprises a deployment optimization logic implemented by a processor 116 under control of a software program installed on the cloud resource manager 106. Additionally, the cloud resource manager 106 comprises a local memory 118 accessible by the processor 116. The local memory 118 stores information pertaining to modifiers applicable to a resource in the computing clouds 102A, 102B to add, remove or change a property of the resource. Each modifier is associated with metrics information for being evaluated by the processor 116 in connection with implementing the deployment optimization logic. The metrics information associated with each modifier may relate to a large variety of parameters, including one or more of a time parameter, a bandwidth parameter, a processing power parameter, a storage parameter, and a cost parameter. Such metrics information can optionally also be associated with each base resource template as stored in the resource description database 108.

Figure 2:
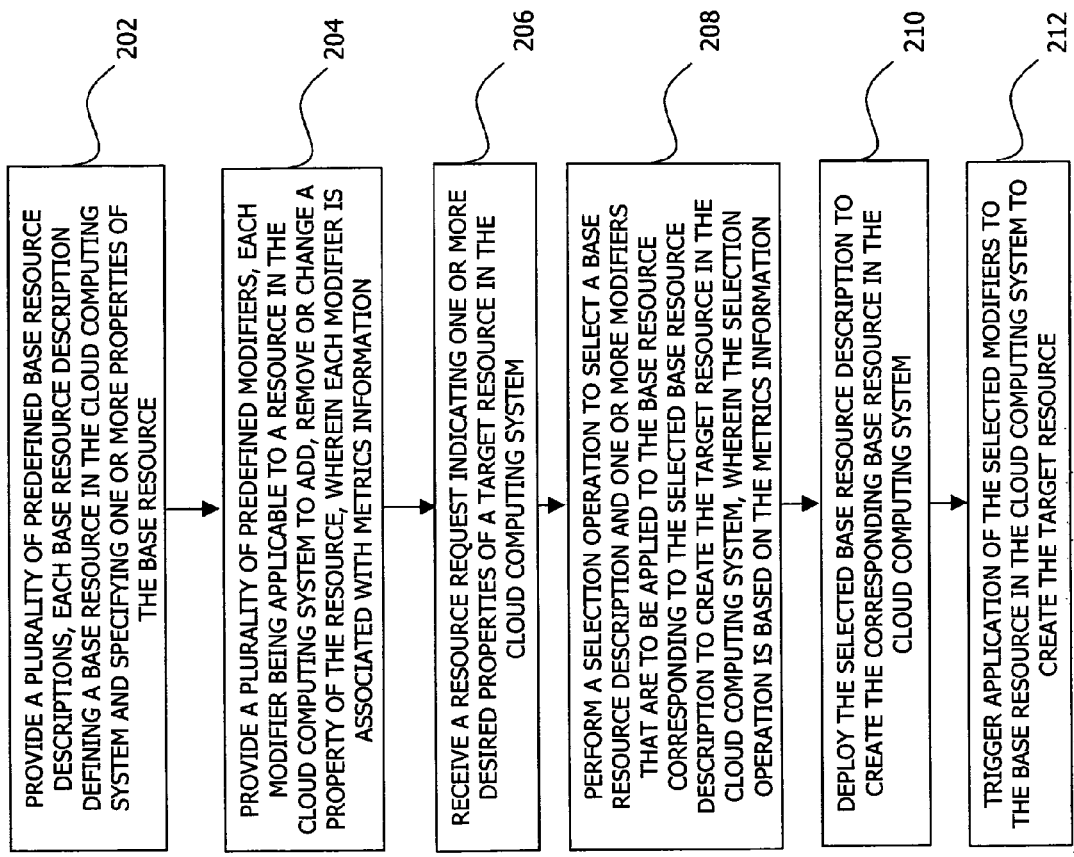
FIG. 2 is a schematic flow diagram illustrating a method embodiment of the technique presented herein.

In the following, an exemplary mode of operation of the cloud computing system 100 of FIG. 1, and in particular of the cloud resource manager 106, will be described with reference to the flow diagram 200 of FIG. 2. FIG. 2 illustrates a method embodiment for creating a resource in the cloud computing system 100 of FIG. 1.

As mentioned above, the cloud computing system 100 is configured to provide, in two initial steps 202, 204, a plurality of predefined base resource descriptions as well as a plurality of predefined modifiers. The base resource descriptions are dynamically maintained in the resource description database 108 and modifier-related information is dynamically kept in memory 118. In an alternative embodiment, the modifier-related information could be provided by the database 108 (in addition to the base resource descriptions) or by the computing clouds 102A, 102B.

The process of creating a resource in any of the computing clouds 102A, 102B is triggered by receipt of a resource request by the cloud resource manager 106 (over the requestor interface 110) from any one of the resource requestors 104A, 104B, 104C as denoted by reference numeral 1 in FIG. 1 (step 206 in FIG. 2). The resource request indicates one or more desired properties (e.g., configurations) of a target resource to be deployed in the computing clouds 102A, 102B. As an example, the resource request may indicate that a target resource in the form of a virtual machine running a predefined software suite that is configured in a specific way needs to be deployed. Optionally, the resource request may also indicate the number of instances of the target resource that need to be deployed. Still further, the resource request may also indicate target resource properties that impose certain requirements on the computing cloud 102A, 102B in which the target resource is to be deployed. It should be noted that the resource request may be received in the form of a single message or via multiple messages from the respective resource requestor 104A, 104B, 104C.

In a subsequent step 208, the processor 116 evaluates the resource request and processes it under control of the deployment optimization logic (reference numeral 2 in FIG. 1). The core task of the deployment optimization logic is to select a base resource description (i.e., template) from the resource description database 108 as well as one or more modifiers that are to be applied to the base resource corresponding to the selected base resource description to create the requested target source in one or more of the computing clouds 102A, 102B. The corresponding selection operation is based on the metrics information associated with the modifiers and, optionally, the base resource descriptions. In this regard, the selection operation comprises an optimization procedure that ensures that the requested target resource with the desired properties is provided in an optimal way (e.g., with lowest costs for the corresponding resource requestor 104A, 104B, 104C or with respect to the fastest deployment). As will be appreciated, the optimal way will be dependent on the nature of the metrics information.

The selection in step 208 may additional comprise determining a suitable one of the computing clouds 102A, 102B for resource deployment. This determination may be based on properties specified in the resource request. Such properties concern, for example, certain latency and/or availability requirements regarding the target resource to be deployed. In one implementation, the cloud determination process may precede the selection operation with respect to the base resource templates 114 and modifiers.

The selection operation performed in step 208 may yield various optimization results. According to a first result, the cloud resource manager 106 finds a base resource description in the resource description database 108 that fully matches the requested properties of the target resource. In such a case, the cloud resource manager 106 will, in step 210, deploy (i.e., upload) the selected base resource description via the cloud interface 112 to the appropriate computing cloud 102A, 102B (reference numeral 3 in FIG. 1).

The corresponding computing cloud 102A, 102B will notify the cloud resource manager 106 of the availability of the requested resource (i.e., of the fact that the requested resource has been deployed) as indicated by reference numeral 4 in FIG. 1. This notification may be accompanied by resource utilization information pertaining, for example, to a network address of the deployed resource (e.g., an Internet Protocol, IP, address), login credentials for the deployed resource (e.g., a user name and/or a password), and service configuration information pertaining to the deployed resource (e.g., port information). The corresponding resource utilization information is forwarded by the cloud resource manager 106 via the requestor interface 110 to the particular resource requestor 104A, 104B, 104C from which the resource request has been received (as indicated by reference numeral 6 in FIG. 1).

According to another optimization result, there exists no base resource description in the resource description database 108 that fully matches the desired properties of the requested target resource. In such a scenario, the cloud resource manager 106 selects a base resource description that has already portions of the desired properties. Additionally, the cloud resource manager 106 determines one or more modifiers that need to be applied to the corresponding base resource to create the requested target resource (as indicated by reference numeral 5 in FIG. 1). As mentioned above, this selection is based on the metrics information associated with the modifiers and may involve an optimization procedure. If more than one modifier is selected, the optimization procedure may also be indicative of a specific sequence in which the modifiers have to be applied so as to create the target resource based on the selected base resource description.

Once the selection operation has yielded both a base resource description and one or more modifiers, the selected base resource description is again deployed (i.e., uploaded), in step 210 of FIG. 2, to a selected one of the computing clouds 102A, 102B. As soon as the base resource corresponding to the deployed base resource description becomes available in the corresponding computing cloud 102A, 102B, the cloud resource manager 106 triggers, again via the cloud interface 112, application of the selected modifiers to the deployed base resource to create the requested target resource (step 212 in FIG. 2).

In general, a modifier adds, removes or changes a property of a resource deployed in any of the computing clouds 102A, 102B. In this connection, triggering application of a modifier may result in one or more of the following operations being performed in relation to the deployed resource:

execution of one or more scripts (e.g., of bash scripts),
    installation of one or more software packages,
    copying of files to the deployed resource (e.g., from another source of the cloud computing system 100 to the deployed resource or within the deployed resource),
    an HTTP-based operation (e.g., to upload and deploy software to an application server on which the resource is deployed or which constitutes the deployed resource),
    the creation, deletion or modification of files on the deployed resource.

According to a third optimization result, the cloud resource manager 106 may determine during the optimization procedure that it is more efficient to re-use an idle resource already available in any of the computing clouds 102A, 102B (e.g., a running virtual machine) than creating a "fresh" base resource by deploying a base resource description. In such a case, step 210 in FIG. 2 can be omitted and the selected modifiers, if any, may in step 212 directly be applied to the deployed idle resource to turn it into the requested target resource.

As understood herein, an idle resource is a resource currently not assigned to or used by any of the resource requestors 104A, 104B, 104C. As will be appreciated, omitting the deployment step 210 accelerates the availability of the requested target resource. In the optimal case, the cloud resource manager 106 determines that an idle resource exactly matches the desired properties of the requested target resource, so that the target resource can be provided almost instantly. In one implementation, the cloud resource manager 106 deploys one or more idle resources preemptively (e.g., based on any of the base resource descriptions) in order to react quickly on resource requests pertaining to regularly or frequently requested target resources.

It will be appreciated that the notification procedures pertaining to resource utilization information (reference numerals 4 and 6 in FIG. 1) may also be implemented in accordance with the second and third optimization results discussed above (i.e., in the case modifiers are to be applied or an idle resource is selected).

As has become apparent from the above, the core component of the cloud computing system is the cloud resource manager 106 which manages all available clouds 102A, 102B and resources, and their respective configurations. The cloud resource manager 106 is configured to determine the optimal cloud 102A, 102B in which a particular resource is to be deployed and a deployment basis (e.g., a base resource description or an idle resource) as well as potentially necessary modifiers. The management task of the cloud resource manager 106 includes creating, maintaining the state of, modifying and terminating resources. For the individual computing clouds 102A, 102B, management also includes maintaining information on protocols and interfaces for controlling and configuring the resources deployed therein, maintaining state and cost information, and so on. In order to manage multiple computing clouds 102A, 102B, the cloud resource manager 106 typically implements APIs to various clouds (e.g., the EC2 and VMware vSphere and vCloud APIs).

In the following, an exemplary graph-based embodiment for performing the selection operation of step 208 of FIG. 2 will be described with reference to the schematic diagram 300 of FIG. 3. Diagram 300 illustrates a graph indicative of the relations between base resource templates, resources and modifiers.

Figure 3:
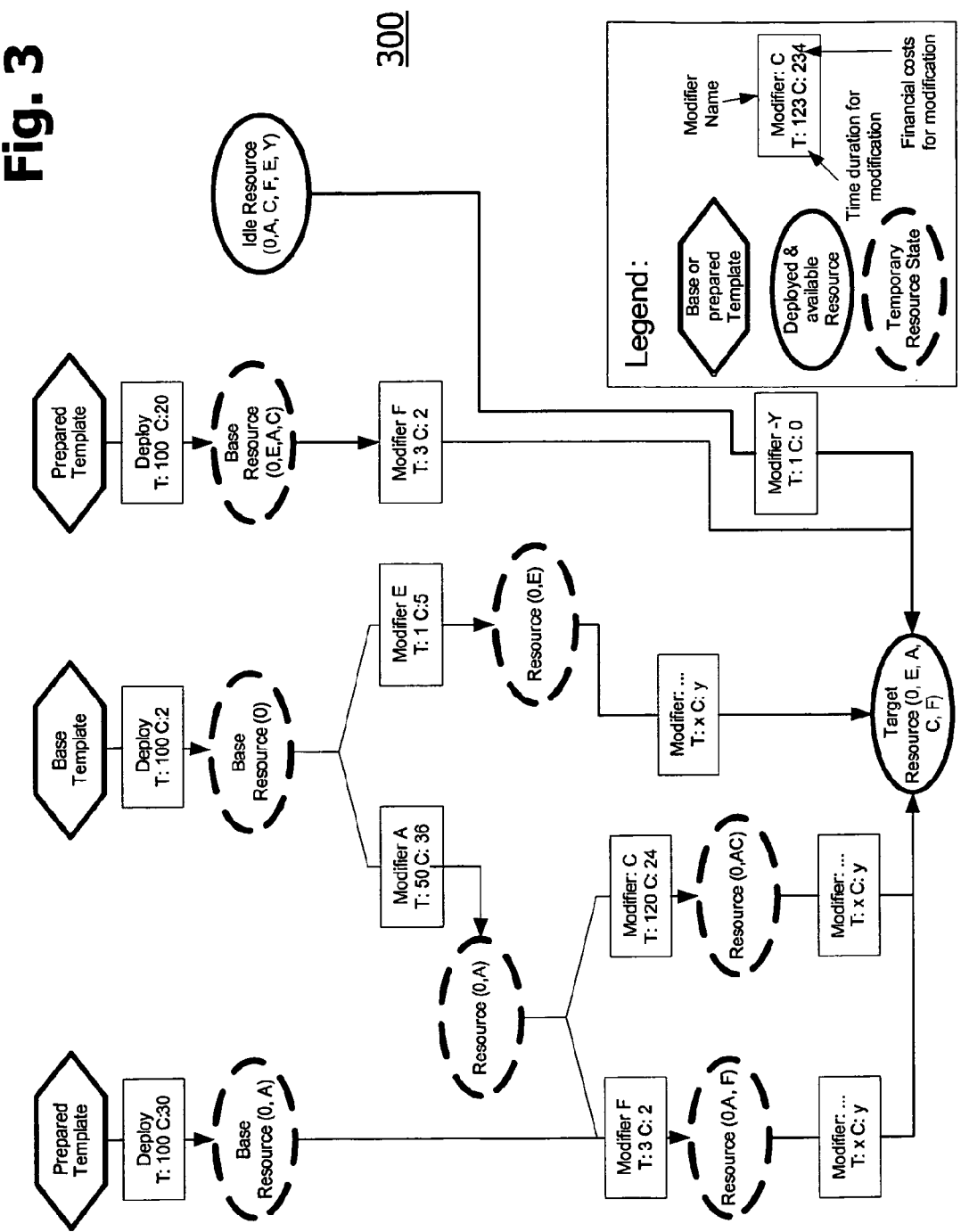
FIG. 3 is a schematic diagram illustrating an embodiment of a graph-based approach for selecting base resource descriptions and modifiers to arrive at a desired target resource.

Specifically, FIG. 3 shows a directed graph that is generated in response to receipt of the resource request (in step 206) indicative of desired properties of a target resource. In a first step, the deployment optimization logic running on the processor 116 of the cloud resource manager 106 determines all base resource templates which can potentially form the basis for creating the requested target resource. Optionally, idle resources of the computing clouds 102A, 102B may also be taken into account in this regard as possible base resources. Furthermore, the deployment optimization logic determines all modifiers that need to be applied to the base resources corresponding to the base resource templates or the idle resources thus determined to create the requested target resource. As depicted in FIG. 3, there may be multiple possibilities to create the target resource by starting from different base resources (including idle resources) and applying different modifiers.

In the exemplary scenario illustrated in FIG. 3, it is assumed that the base resources corresponding to three base resource templates and to a single idle resource are potential candidates for creating the requested target resource. The corresponding templates or idle resources are thus visualized as first terminal nodes (root nodes) in FIG. 3. The target resource, on the other hand, is visualized as a single second terminal node (leaf node) on the opposite end of the graph. The individual modifiers are arranged as internal nodes between the multiple root nodes and the single leaf node in the graph of FIG. 3.

The processes of deploying a base resource different from an idle resource and of applying a modifier to a resource in the computing clouds 102A, 102B are each associated with certain costs. For this reason, corresponding metrics information (e.g., with respect to time T or financial costs C) are associated as weights with each root node and each inner node. It should be noted that for a specific node a separate set of metrics information may be provided for each computing cloud 102A, 102B.

The deployment optimization logic running on the processor 116 implements an optimization procedure to find an optimal path from any of the root nodes (base resources) to the leaf node (target resource). Various path optimization procedures can be used in this regard, such as shortest path logics that exploit graph search algorithms or heuristics (e.g., Dijkstra's algorithm).

The path optimization procedure may take different items of metrics information into account. As an example, in a time-critical scenario the time T may be minimized, while in other scenarios it may be desired to minimize the costs C. Knowing the shortest path (i.e., the optimal base resource and sequence of modifiers that need to be applied thereto to arrive at a certain target resource) for each of the computing clouds 102A, 102B, the deployment optimization logic can select the particular computing cloud 102A, 102B most suitable for deployment of the target resource (e.g., the computing cloud 102A, 102B with the lowest costs, lowest latency or highest availability). At the end of the selection procedure, the base resource template derived by the shortest path logic may be deployed to the selected cloud (or, alternatively, it is determined that a running idle resource would constitute a better base resource). Subsequently, application of the selected modifiers (optionally in a specific sequence) to the base resource is triggered to create the requested target resource.

An example for implementing the shortest path logic will in the following be described in more detail with reference to the particular properties and metrics given in FIG. 3. It will be assumed here that the resource request received in step 206 requests deployment of a target resource having the properties (0, E, A, C, F). For example, the property (0) may be indicative of a virtual machine with only an operating system installed thereon, and the properties (0, A) may be indicative of a virtual machine with an operating system plus some pre-configured software (such as a Sailfin application server). The corresponding target resource constitutes the leaf node of the graph in FIG. 3.

In the example of FIG. 3, four possible base resources were determined as possible candidates for creating the target resource with the properties (0, E, A, C, F). Three of the base resources have not yet been deployed and correspond to base resource templates available in the resource description database 108. The fourth base resource corresponds to an idle resource that has already been deployed earlier. In the example of FIG. 3, two types of base resource templates are distinguished, namely of the so-called "base" type and of the so-called "prepared" type. A base resource template of the "base" type is provided statically (but can be updated), while a base resource template of the "prepared" type has dynamically been created as will be discussed in more detail below.

When applying a modifier to a deployed resource, the properties of the corresponding resource are changed accordingly. For instance, applying the modifier (A) to a base resource (0) results in a modified resource with properties (0, A). It should be noted that the modifier may not only add a certain property, but may also remove a certain property (e.g., by deleting an item of software from a deployed resource) as illustrated for the modifier "-Y" in FIG. 3.

As shown in FIG. 3, a resource can be in a temporary state, which means that a further modification will be made to the resource. A non-temporary resource state is either the target state ("target resource") or a pre-deployed resource running in an idle state ("idle resource").

When evaluating the graph of FIG. 3 with the shortest path logic, the path associated with the minimum aggregated deployment time or minimum aggregated deployment cost will be determined. The base resource defining the root node of the shortest path as well as the one or more modifiers (typically in a suitable sequence) defining the course of the shortest path will then be selected in step 208. If the selected base resource is found to not be in an idle resource, the corresponding base resource template will need to be deployed before the selected modifiers can be applied.

As has already been mentioned above, new base resource templates (of the "prepared" type) can be created dynamically. If, for example, a target resource with certain properties is requested frequently, the deployment optimization logic running on the processor 116 may decide to create a new base resource template with these properties. The corresponding creation operation may require applying an additional modifier in order to transform a target resource with certain properties into a base resource with the same properties. Such an additional modifier may, for example, delete information that is specific to a deployed resource (such as Medium Access Control, MAC, addresses).

In the example illustrated in FIG. 3, the base resource template of the "prepared" type on the right hand side provides a deployed base resource which has already all desired properties except (F), which can be added by applying a single additional modifier. Compared to the base resource template of the "base" type, which only has property (0), the number of modifiers that need to be applied can thus be reduced. When deployment time is a crucial optimization criterion, the corresponding base resource template of the "prepared" type can thus lead to a significantly shorter deployment time.

The deployment optimization logic may also decide to delete a base resource template of the "prepared" type according to predefined deletion criteria. One exemplary deletion criterion may comprise deleting a template of the "prepared" type if it has not been used (e.g., deployed) for a long time. As long as the template of the "base" type the template of the "prepared" type was derived from still exists, it still remains possible to create the corresponding target resource (albeit with a longer chain of modifiers that need to be applied).

The dynamic template maintenance mechanism is also useful when an original template of the "base" type gets updated. In this case, all templates of the "prepared" type derived from the original template of the "base" type can simply be deleted and automatically re-created taking into account the update. Accordingly, it is not necessary to update related templates individually, which constitutes a tremendous efficiency gain in template management.

The dynamic template management can also include the provisioning of idle base resources as discussed above. Idle base resources can be re-used when they become available again, but can also be pre-emptively deployed. In this regard, various deployment strategies can be implemented. If a very generic base resource (e.g., with property (0) only) is kept in "stand-by", this approach can be more costefficient than the use of templates of the "prepared" type. Another option is to keep an idle base resource derived from a template of the "prepared" type in stand-by to shorten the target resource deployment time even more.

As has become apparent from the above description of exemplary embodiments, the technique presented herein allows for a flexible management of cloud resources based on a modifier concept. In particular, cloud resources can be deployed quickly, while customization and maintenance procedures (including updates, life cycle management and virtual machine image management) are facilitated.

While the technique presented herein has been described with respect to particular embodiments, those skilled in the art will recognize that the invention is not limited to these specific embodiments. Therefore, it is to be understood that the present disclosure is only illustrative. It is intended that the invention be limited only by the scope of the claims appended hereto.

The invention claimed is:

1. A method of creating a resource in a cloud computing system, comprising:
   providing a plurality of predefined base resource descriptions, each said predefined base resource description defining a base resource in the cloud computing system and specifying one or more properties of the base resource;
   providing a plurality of predefined modifiers, each modifier being applicable to a resource in the cloud computing system to add, remove or change a property of the resource, wherein each modifier is associated with metrics information;
   receiving a resource request indicating one or more desired properties of a target resource in the cloud computing system;
   performing a selection operation to select a base resource description and one or more modifiers that are to be applied to the base resource corresponding to the selected base resource description to create the target resource in the cloud computing system, wherein the selection operation is based on the metrics information;
   deploying the selected base resource description to create the corresponding base resource in the cloud computing system; and
   triggering application of the selected modifiers to the base resource in the cloud computing system to create the target resource.

2. The method of claim 1, wherein the cloud computing system comprises a plurality of individual computing clouds, and further comprising:
   selecting one or more of the computing clouds based on at least one of the metrics information, proximity to a resource requestor, latency with respect to the resource requestor, latency with respect to the target resource, reliability with respect to the target resource, and load considerations; and
   deploying the base resource description to the selected one or more computing clouds.

3. The method of claim 1, further comprising receiving, from the cloud computing system, resource utilization information and forwarding the resource utilization information to a resource requestor.

4. The method of claim 3, wherein the resource utilization information comprises at least one of a network address of the target resource, login credentials for the target resource, and service configuration information pertaining to the target resource.

5. The method of claim 1, wherein the selection operation comprises performing an optimization procedure based on the metrics information.

6. The method of claim 1, further comprising defining at least one graph having nodes, wherein the nodes comprise
one or more resource nodes representative of the base resource descriptions or the corresponding base resources;
one or more modifier nodes representative of the modifiers or of resources to which the modifiers have been applied, wherein the metrics information is associated as weight with each modifier node.

7. The method of claim 5, wherein the selection operation comprises performing a path optimization procedure in the at least one graph based on the metrics information.

8. The method of claim 6, wherein the at least one graph is a directed graph in which each resource node defines a terminal node and each modifier node defines a child node of at least one terminal node or of at least one other child node.

9. The method of claim 8, wherein the at least one graph comprises
a single first terminal node located at a first end of the graph and representative of the target resource;
one or more second terminal nodes located at a second end of the graph opposite to the first end and representative of all base resources to which modifiers can be applied to create the target resource; and
one or more inner nodes corresponding to all modifiers that, when applied singly or in combination to any base resource, result in the target resource.

10. The method of claim 9, wherein the selection operation comprises determining the shortest path between the first terminal node and any of the second terminal nodes.

11. The method of claim 5, wherein the graph is defined in response to receipt of the resource request.

12. The method of claim 1, wherein each base resource description is associated with metrics information, and wherein the selection operation is additionally based on the metrics information associated with the base resource descriptions.

13. The method of claim 1, wherein the metrics information relate to at least one of a time parameter, a bandwidth parameter, a processing power parameter, a storage parameter, and a cost parameter.

14. The method of claim 1, further comprising creating a new base resource description based on frequently requested resource properties.

15. The method of claim 1, further comprising
defining one or more deletion criteria for deleting base resource descriptions; and
deleting a base resource description in accordance with the one or more deletion criteria.

16. The method of claim 1, further comprising
determining, based on the metrics information, that an idle resource already deployed in the cloud computing system is more suitable as a base resource for creating the target resource than any base resource created by still deploying a base resource description;
selecting the modifiers required to create the target resource from the idle resource; and
triggering application of the selected modifiers to the idle resource in the cloud computing system to create the target resource.

17. The method of claim 16, further comprising pre-emptively deploying at least one base resource description to create at least one idle resource.

18. The method of claim 1, wherein the base resources comprise at least one of one or more virtual machines, one or more virtual network elements, one or more virtual core nodes of a telecommunication system and one or more virtual data storages.

19. The method of claim 18, wherein the one or more base resource descriptions for the one or more virtual machines each defines a virtual machine image.

20. The method of claim 1, wherein the base resource descriptions are configured as at least one of resource templates and parameter sets.

21. The method of claim 1, wherein the resource properties relate to at least one of absence or installation of a particular operating system, absence or installation of a particular application software, and configuration of a particular application software.

22. The method of claim 1, wherein the modifiers are adapted to configure a resource based on at least one of the following operations in the cloud computing system: execution of a script, installation of a software package, a HTTP-based operation, and a file operation.

23. A computer program product comprising a non-transitory computer readable medium storing program code for causing a computing device to perform the steps of claim 1 when the computer program code is executed by the computing device.

24. A device adapted to create a resource in a cloud computing system, comprising:
access to a storage providing a plurality of predefined base resource descriptions, each said predefined base resource description defining a base resource in the cloud computing system and specifying one or more properties of the base resource, and to a plurality of predefined modifiers, each modifier being applicable to a resource in the cloud computing system to add, remove or change a property of the resource, wherein each modifier is associated with metrics information;
a requestor interface adapted to receive a resource request indicating one or more desired properties of a target resource in the cloud computing system;
a processor adapted to select a base resource description and one or more modifiers that are to be applied to the base resource corresponding to the selected base resource description to create the target resource in the cloud computing system, wherein the selection is based on the metrics information; and
a cloud interface adapted to deploy the selected base resource description to create the corresponding base resource in the cloud computing system and to trigger application of the selected modifiers to the base resource in the cloud computing system to create the target resource.

25. A cloud computing system comprising the device of claim 24.

* * * * *